(12) United States Patent
Bantwal

(10) Patent No.: US 7,801,307 B2
(45) Date of Patent: Sep. 21, 2010

(54) METHOD OF SYMMETRIC KEY DATA ENCRYPTION

(75) Inventor: Jayadeep Bantwal, Bangalore (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1369 days.

(21) Appl. No.: 11/193,554

(22) Filed: Jul. 28, 2005

(65) Prior Publication Data

US 2007/0064933 A1 Mar. 22, 2007

(51) Int. Cl.
*H04L 9/00* (2006.01)
(52) U.S. Cl. .................................. 380/260; 380/259
(58) Field of Classification Search ................. 380/259, 380/260
See application file for complete search history.

(56) References Cited

U.S. PATENT DOCUMENTS

| | | | |
|---|---|---|---|
| 6,823,068 B1 | 11/2004 | Samid | |
| 2002/0027552 A1* | 3/2002 | Lee | 345/421 |
| 2007/0116273 A1* | 5/2007 | Kurdziel | 380/37 |

FOREIGN PATENT DOCUMENTS

DE 3904831 A1 9/1989

OTHER PUBLICATIONS

BBC Guide Entry: Polyalphabetic Field Ciphers, Jun. 27, 2001.*
Army Field Manual, Basic Cryptanalysis, Sep. 13, 1990.*
Lee, Lin-shan, A Speech Security System Not Requiring Synchronization, Jul. 1985-vol. 23, No. 7.
International Search Report, Dec. 7, 2007.
L, Lee: "A Speech security system not requiring synchronization", IEEE Communications Magazine USA, [Online] vol. 23, No. 7, Jul. 1985, pp. 42-55, XP002459159 ISSN: 0163-6804 <URL http://ieeexplore.ieee.org/iel5/35/238/32/01092608.pdf?tp=&isnumber=&arnumber=1092608> [retrieved on Nov. 14, 2007].
Tim Schneider, "Analyse und Design von symmetrischen Blockchiffrierern", Thesis, Aug. 13, 1999, pp. 0, I-XII, 1-121, XP002459160 Bremen with summary translation.
International Search Report for PCT/US2006/027827 dated Nov. 22, 2007.

* cited by examiner

*Primary Examiner*—Nasser Moazzami
*Assistant Examiner*—Lisa Lewis
(74) *Attorney, Agent, or Firm*—McCormick, Paulding & Huber LLP

(57) ABSTRACT

A method of symmetric key encryption involves using a composition of transformations leading to an enhanced homophonic substitution, wherein the mapping of characters varies depending on the sequence of characters in the message text. In carrying out the method, encryption keys are first generated. Then, a polyalphabetic substitution is performed, which involves XOR'ing (e.g., a Boolean logical exclusive OR operation/calculation) the plaintext data elements with the generated keys. Next, the storage format is changed, from big-endian to little-endian or vice versa, and the data is stored in one or more square matrices. Finally, enhanced homophonic substitution is performed, meaning that for each element, the subset to which the element can be mapped to in the co-domain is the entire co-domain itself, thus providing the largest possible subset for the given co-domain. In other words, any given element in the domain can be mapped to any of the elements of the co-domain.

7 Claims, 4 Drawing Sheets

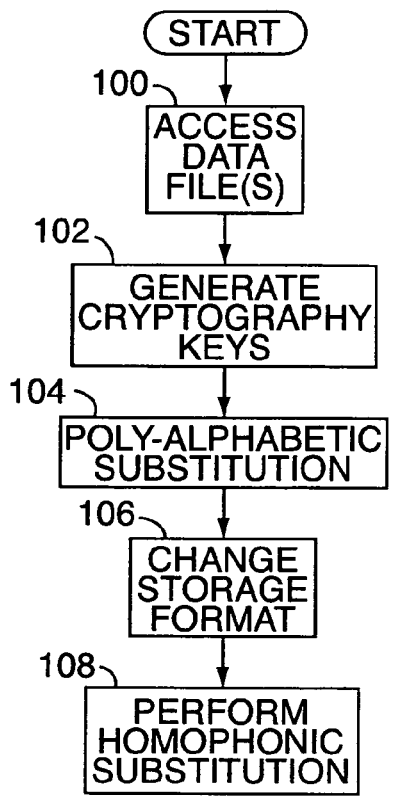
FIG. 1
| HEX | BINARY | DECIMAL |
|-----|--------|---------|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| A | 1010 | 10 |
| B | 1011 | 11 |
| C | 1100 | 12 |
| D | 1101 | 13 |
| E | 1110 | 14 |
| F | 1111 | 15 |
FIG. 3
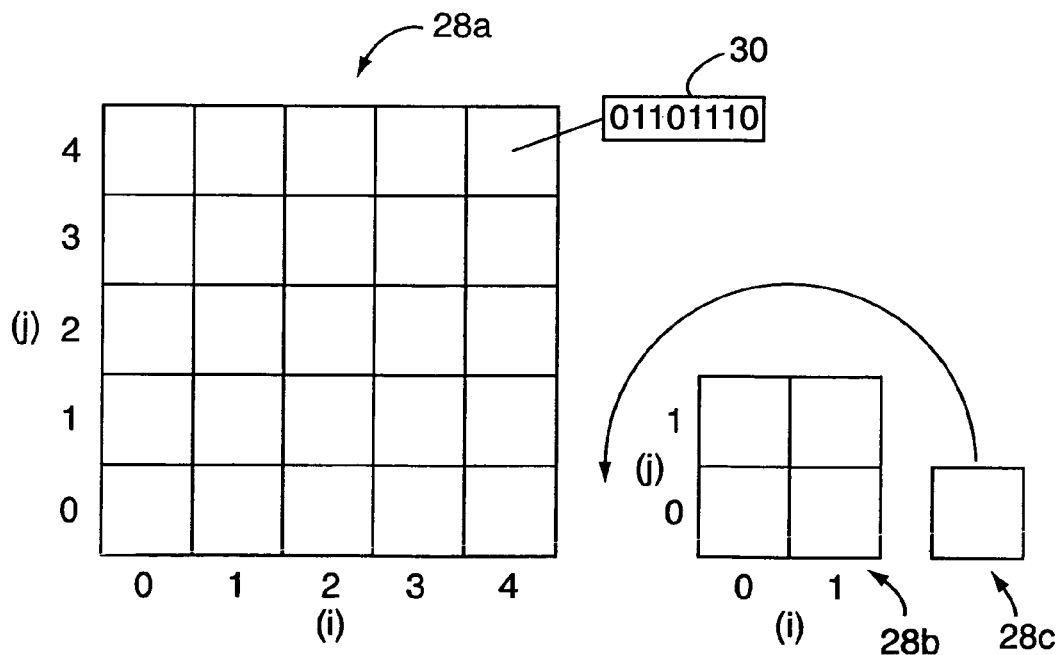
FIG. 6

METHOD OF SYMMETRIC KEY DATA ENCRYPTION

FIELD OF THE INVENTION

The present invention relates to cryptography and, more particularly, to coded data generation or conversion.

BACKGROUND OF THE INVENTION

Cryptography techniques have been widely used for transmitting data over networks to provide information security. Several different techniques and algorithms for encrypting information have been proposed, and many of these techniques are currently being widely used in the industry for encryption. Encryption techniques can be classified either as symmetric key encryption or public key encryption. The main criteria for selecting a particular technique and algorithm for encryption are the level of security provided by the technique, overall performance, and ease of implementation.

Symmetric key encryption involves using the same cryptographic key to encrypt and decrypt the data message in question. Typically, the decryption key can be computed from the encryption key and vice versa. Algorithms for symmetric key encryption can usually be electronically executed very quickly. However, a copy of the cryptographic key should be kept secret or otherwise securely maintained at each end of the encrypted transmission. Some of the most well known symmetric key data encryption techniques are simple substitution ciphers, homophonic substitution ciphers, polyalphabetic substitution ciphers, transposition ciphers, composition of ciphers, and stream ciphers.

SUMMARY OF THE INVENTION

According to an embodiment of the present invention, a method of symmetric key data encryption may involve using a composition of transformations leading to an enhanced homophonic substitution, wherein the mapping of characters varies depending on the sequence of characters in the message text. In carrying out the method, encryption keys are first generated. Then, a polyalphabetic substitution is performed on the data, which involves "XOR'ing" (e.g., a Boolean logical exclusive OR operation/calculation) the original data with the generated keys. Next, the storage format is changed, from big-endian to little-endian or vice versa. Finally, enhanced homophonic substitution is performed after placing the data in one or more square matrices.

Existing homophonic substitutions may map each element in the pre-substitution domain to disjoint subsets in the post-substitution co-domain. The enhanced homophonic substitution of the present invention may be an involution such that the subset to which the element may be mapped in the co-domain is the entire co-domain itself. Consequently, any given element in the domain may be mapped to any of the elements of the co-domain. In addition, the particular element in the co-domain to which an element in the domain is mapped changes depending on the sequence of characters or other data elements in the data block and the keys chosen.

One embodiment of the present invention may be characterized as a method of homophonic substitution for encrypting a plurality of data elements, where each data element is mapped from a pre-substitution domain to one of a plurality of elements in a post-substitution co-domain, and where each of the data elements is mappable to any of the co-domain elements. For mapping the data elements to the co-domain elements, a portion of the data element in each cell in each square matrix is swapped with data in another cell. Specifically, one nibble of four bits (the bits are not necessarily consecutive) from one cell is swapped diagonally across the matrix with a nibble in another cell. The particular pairs of cells are chosen based on a formula for diagonal swapping. The positions of the bits to be swapped are calculated according to a linear equation that is based on the values of the cryptographic keys and that changes for each swap depending on the sequence of data elements in the pre-substitution domain.

According to an additional embodiment of the present invention, the data encryption method may involve performing a polyalphabetic substitution operation on the data using one or more cryptographic keys, and then changing a storage format of the data (optionally from big-endian format to little-endian format or vice versa). Subsequently, a homophonic substitution operation may be performed on the data, e.g., the enhanced homophonic substitution operation described above, or another homophonic substitution operation. The cryptographic key(s) may be generated by concatenating one or more intermediate keys and an initial key, where the number of intermediate keys is based on a key depth and the intermediate keys are calculated from the initial key.

BRIEF DESCRIPTION OF THE DRAWINGS

The present invention will be better understood from reading the following description of non-limiting embodiments, with reference to the attached drawings, wherein below:

FIG. 1 is a flow chart showing the steps of a method for symmetric key data encryption according to an embodiment of the present invention;

FIG. 3 is a standard hexadecimal to binary to decimal conversion chart;

FIG. 6 is a schematic diagram of intermediate cipher text arranged in square matrices.

DETAILED DESCRIPTION

Figure 2:
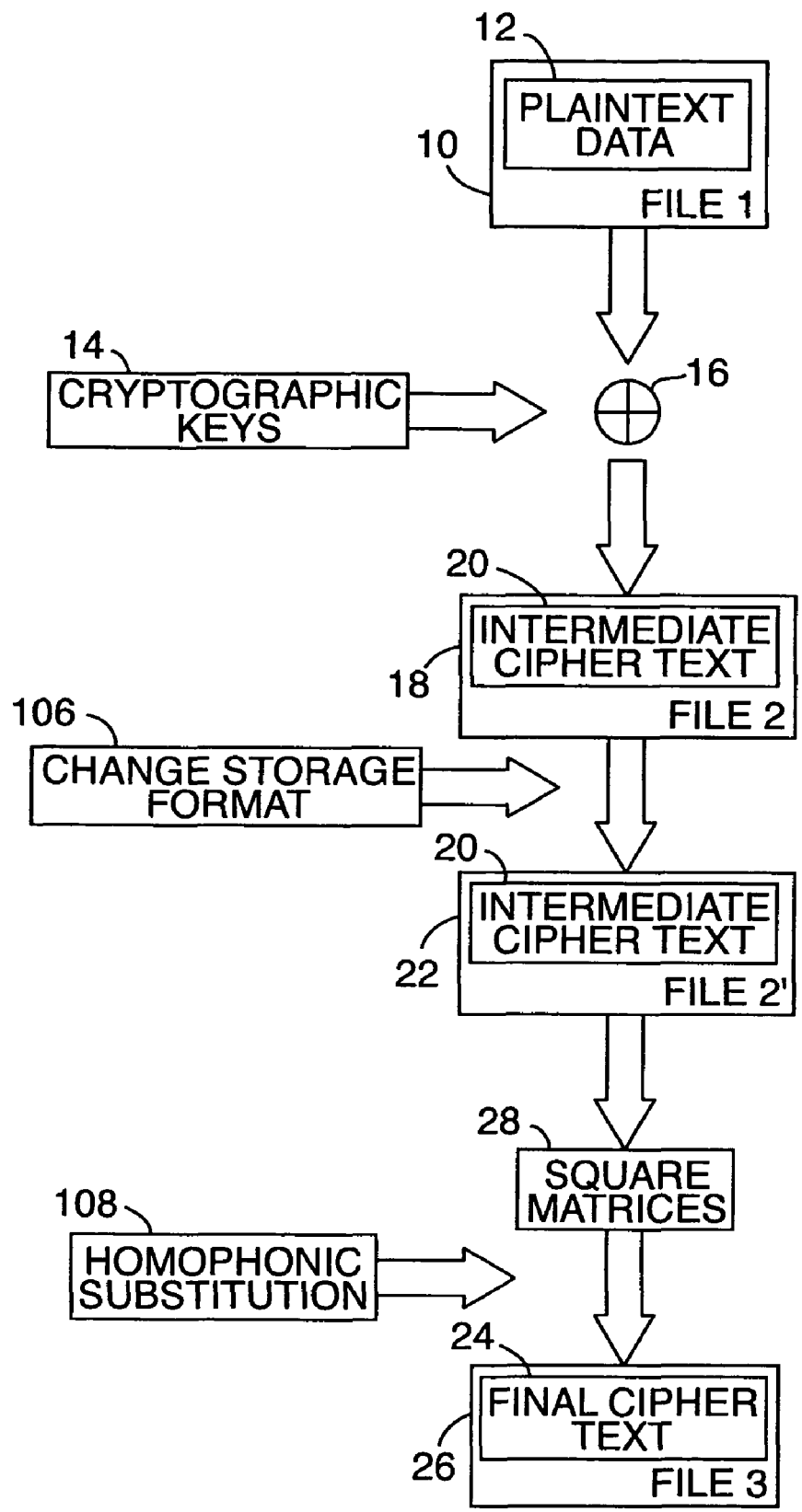
FIG. 2 is a schematic diagram of the method.

With reference to FIGS. 1-6, an embodiment of the present invention relates to a method of encrypting data using a symmetric key algorithm. Typically, the method will be implemented as computer programming code for carrying out the method using a computer or other electronic device. To encrypt the data in question, a file 10 containing the "plaintext" data 12 (meaning the original data to be encrypted) is accessed at Step 100. For example, the file may be an electronic file or record containing the data in computer readable form, e.g., data in binary format or the like. In Step 102, one or more cryptographic keys 14 are generated for use in encrypting the plaintext data 12. This may be done prior to accessing the data file 10. Then, in Step 104, a polyalphabetic substitution is performed, which involves "XOR'ing" 16 (e.g., a Boolean logical exclusive OR calculation/operation, also known as modulo 2 addition) the data 12 with the generated cryptographic keys 14 to produce a record, file, or other data array 18 containing intermediate cipher text 20. In other words, intermediate cipher text 20=plaintext data 12⊕cryptographic keys 14. Next, at Step 106, the storage format of the file 18 with the intermediate cipher text 20 is changed, from big-endian to little-endian or vice versa. This results in a revised file or data array 22 containing the intermediate cipher text 20, but in a rearranged storage format/order. (The new file 22 may occupy the same storage space as the original file 18.) Finally, enhanced homophonic substitution of the intermediate cipher text 20 is performed at Step 108 to produce the "final," fully encrypted cipher text 24, which may be stored in a file, record, or data array 26.

The cryptographic keys 14 are generated according to two parameters, a "minimum depth" for the key generation process, and an initial key. As an example, consider a minimum depth of two, and an initial key of 0xCA8E in hexadecimal. (A standard table for converting between hexadecimal, binary, and decimal is shown in FIG. 3.) The initial key is used to generate the set of cryptographic keys 14 as per the steps shown in FIG. 4. Typically, as per the example given, the initial key will correspond to two bytes of data, e.g., a four place hexadecimal number or sixteen place binary number.

First, at Step 110, the initial key is represented in binary form. For example, for the initial key given above (CA8E), the binary representation is: 1100 1010 1000 1110. Next, in Step 112, the decimal equivalent of each nibble (a "nibble" is four bits) in the binary-represented initial key is determined. Thus, Nibble 1=1100=>12; Nibble 2=1010=>10; Nibble 3=1000=>8; and Nibble 4=1110=>14. Next, in Step 114, the product of Nibble 1 and Nibble 4 is computed, e.g., 12·14=168. Then, in Step 116, a modulo 8 operation is performed on the last two digits individually: (6 mod 8=6) and (8 mod 8=0). As should be appreciated, the modulo 8 operation ("a" mod "b"="n") is defined as computing the integer remainder of "a" divided by "b." Thus, (6 mod 8) has an integer remainder of 6, and (8 mod 8) has a remainder of 0, i.e., 8/8=1 remainder 0.

To compute the required depth of key generation, at Step 118, the product of Nibble 2 and Nibble 3 is calculated, e.g., 10·8=80. Then, at Step 120, a modulo 2 operation is performed on the product, e.g., (80 mod 2=0). Again 80/2=40 remainder 0. Then, at Step 122, the initially chosen minimum key depth, e.g., 2, is added to this value. In the current example, this results in a required depth of key generation of two (0+2=2). To summarize:

required depth=min depth+((Nibble_2_decimal·Nibble_3_decimal) mod 2)

If Steps 118-122 have already been performed for calculating the required depth of key generation, as determined in Step 123, the algorithm may proceed directly to Step 124.

Continuing on, at Step 124, using the values obtained in Step 116 (e.g., 6 and 0), Nibble 1 and Nibble 2 are rotated right six times together if the product of the values obtained in Step 116 is even. Otherwise they are rotated left six times. In either case, the extent of rotation is equal to the first value obtained in Step 116, e.g., 6. Similarly, Nibbles 3 and 4 are rotated left or right, as the case may be, to an extent equal to the second value obtained in Step 116, e.g., 0. Thus, in this example Nibbles 3 and 4 are not rotated since the second value obtained in Step 116 is 0. In the present example, after the rotations the initial key 0xCA8E is transformed to 0x2B8E. 0x2B8E is the "level 1" intermediate key. At Step 125, it is determined whether all the required intermediate keys have been calculated, based on the required key depth. For example, if the required depth is three, then three intermediate keys are calculated. Further intermediate keys are generated by reiterating the process on the previous intermediate key. In the present example, since the required depth is two, Steps 112, 114, 116, and 124 are repeated on the level 1 key, e.g., 0x2B8E, to obtain the "level 2" intermediate key, which in the example would be 0xCA8E.

According to its standard meaning, as well known to those in the art, the terms "rotate right" and "rotate left" refer to shifting a binary number (in this case) to the left or right, but with the shifted digits "wrapping around" back to the front or end of the number. If a binary number is rotated right one place, the least significant number (right-most number) is moved to the most significant place (left-most position). Similarly, if a binary number is rotated left one place, the most significant number (left-most number) is moved to the least significant place (right-most position). For example, rotating the binary number 10010111 to the right two places results in 11100101. Rotating the number left one place results in 00101111.

Once the intermediate keys are calculated, the final set of cryptographic keys 14 is obtained at Step 126 by concatenating nibbles of the intermediate keys and the initial key. The sequence of concatenation is:

a) Nibbles 1 and 2 of the level 2 key
b) Nibbles 1 and 2 of the level 1 key
c) Nibbles 1 and 2 of the initial key
d) Nibbles 3 and 4 of the initial key
e) Nibbles 3 and 4 of the level 2 key
f) Nibbles 3 and 4 of the level 1 key.

In the example considered, the final keys would be 0xCA, 0x2B, 0xCA, 0x8E, 0x8E, and 0x8E. If there were additional intermediate keys, these would be used to generate final keys in a similar manner, e.g., a-d) Nibbles 1 and 2 of level 3-1 keys and initial key, respectively; e-h) Nibbles 3 and 4 of initial key and level 3-1 keys, respectively.

Figure 4:
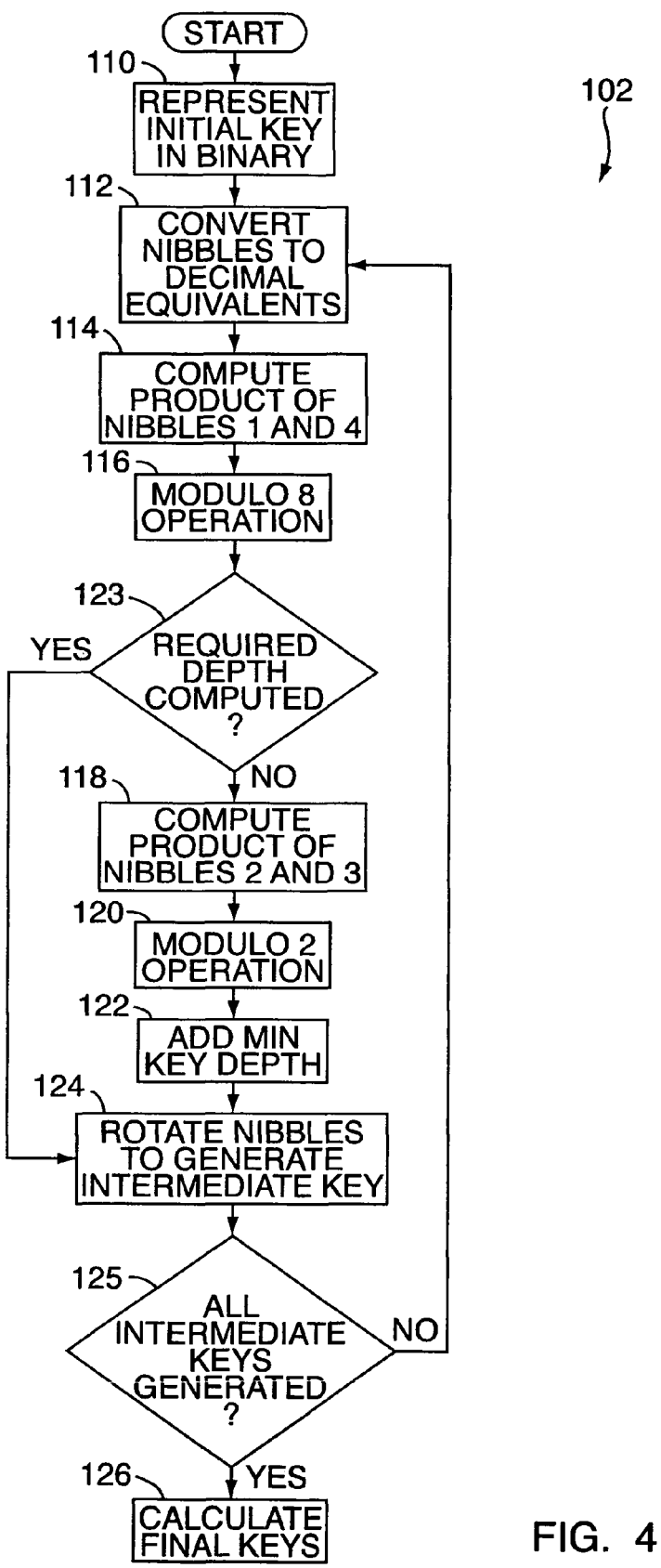
FIG. 4 is a flow chart showing the steps for generating cryptographic keys.
Figure 5:
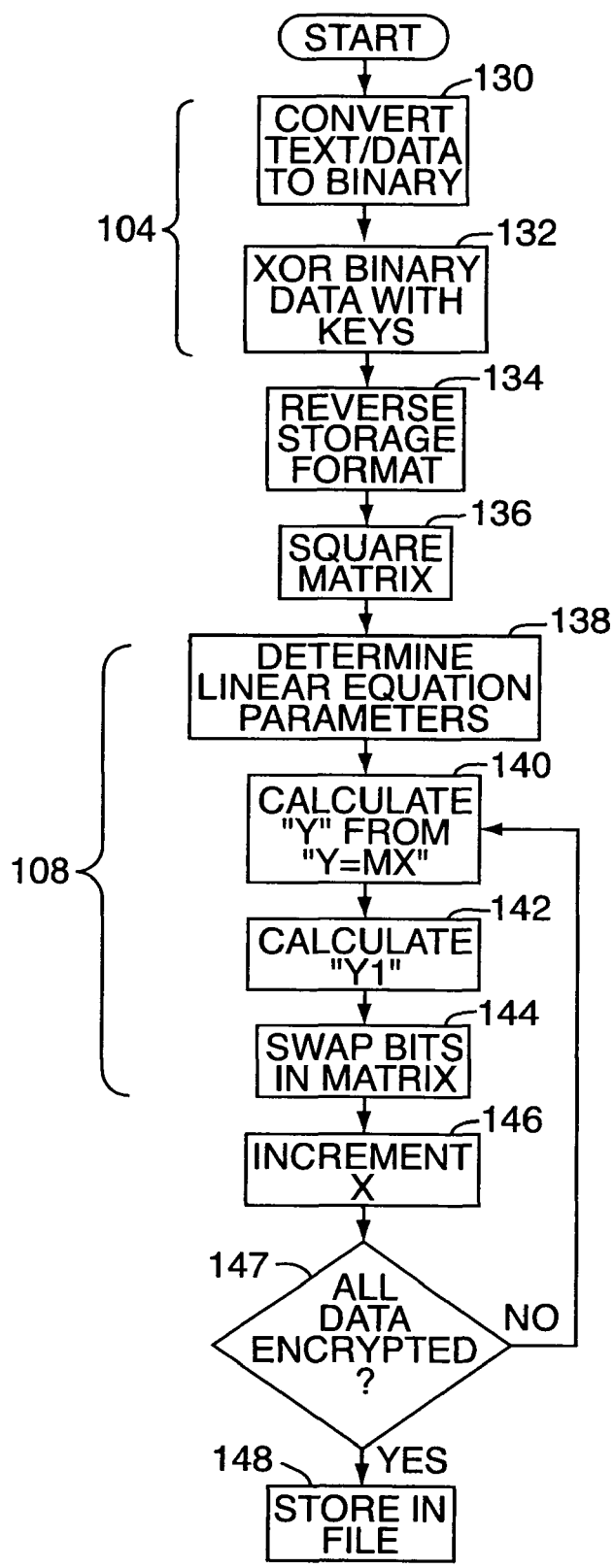
FIG. 5 is a flow chart showing the steps for encrypting data.

With reference to FIG. 5, the next sequence of steps in the data encryption method involves polyalphabetic substitution (Step 104 in FIG. 1) using the keys 14 generated in Step 102 (FIG. 4). At Step 130, the data to be encrypted 12 (e.g., text or the like) is represented in binary equivalents, if needed. For example, text may be converted into ASCII format, wherein each keyboard character has a standard, designated hexadecimal equivalent, e.g., in ASCII the letter "b" has a hex value of 62, and a semi-colon has a hex value of 3B. At Step 132, for polyalphabetic substitution, each data character in binary is XOR'ed with the encryption keys 14 in sequence one after another. In particular, the first data byte is XOR'ed with the first key byte. Then, the next data byte is XOR'ed with the next key byte, and this process continues in a circular queue fashion, i.e., once the last byte of the keys is reached, the process continues from the beginning. According to its standard definition, the XOR function 16 returns a true value (1) if only one of the inputs is true; if both or neither is true, then a false value (0) is returned. Thus, 0 XOR 0=0; 1 XOR 1=0; 1XOR 0=1; and 0 XOR 1=1. So, in applying the XOR function to a lower case letter "b," ASCII hex value of 62 (binary 01100010), the resultant intermediate cipher text 20 would be 62 XOR CA=>01100001 XOR 11001010=10101011. If the next data character was a semi-colon, the resultant intermediate cipher text 20 would be 3B XOR 2B.

Typically, the intermediate cipher text 20 as calculated in Step 132 will be stored in temporary memory or storage 18. At Step 134 (Step 106 in FIG. 1), the storage format of the intermediate cipher text 20 is reversed, from big-endian format to little-endian format or vice versa, depending on how the cipher text 20 is stored initially. "Big-endian" and "little-endian" refer to which bytes are most significant in multi-byte data types, and describe the order in which a sequence of bytes is stored in a computer's memory. In a big-endian system, the most significant value in the sequence is stored at the lowest storage address (e.g., first). In a little-endian system, the least significant value in the sequence is stored first. So, for the binary number 1001 0001 0101 1111:
Big-endian/Little-endian:
Address 0: 1001/1111
Address 1: 0001/0101
Address 2: 0101/0001
Address 3: 1111/1001

At Step 136, the intermediate cipher text 20 is stored in one or more square matrices 28. If "L" is the length of the text to be encrypted in a block, the size "j" of the square matrix is chosen to be the highest possible "J≦L" such that $J=I^2$, $I\epsilon(1, 2, 3, \ldots N)$. In other words, since I is an integer, J=1, 4, 9, 16, $\ldots N^2$, where J is limited to a maximum value of L. Alternatively, the size of the square matrix can be further made dependent on the initial key. In order to choose the matrix size dependent on the initial key, the product "P" of the most significant byte and least significant byte of the initial key is computed. The size of the matrix is chosen as: $J=(2+(P \bmod (I-2)))^2$, $I\epsilon(1, 2, 3, \ldots N)$.

The remaining characters (L-J) are also arranged in a square matrix or matrices. The size "K" of the square matrix for the remaining characters (L-J) is chosen to be the highest possible "K≦(L-J)" such that $K=M^2$, $M\epsilon(1, 2, 3, \ldots N)$. If ((L-J)<4), then after performing the XOR operation the last (L-J) bytes are placed before the characters in the square matrix that are encrypted just prior to these last (L-J) bytes.

FIG. 6 shows how data would be arranged in square matrices for a 30-character data block, L=30. The largest "J" satisfying J≦L and $J=I^2$, $I\epsilon(1, 2, 3, \ldots N)$ would be J=25. Thus, a first matrix for the data would be a 5×5 square matrix 28a. The remaining five characters (L-J=30-25=5) would be arranged in a 2×2 matrix 28b. Since five characters cannot fit in a 2×2 matrix, that would leave one remaining character 28c, which would be placed before the square matrix 28b. As indicated, the square matrices would include the intermediate cipher text divided into 8-bit data elements 30 or the like. (Again, data element means a particular piece, string, or grouping of data.)

Enhanced homophonic substitution is the final step of the encryption method (Step 108 in FIG. 1). Generally speaking, homophonic substitution involves mapping data elements from a pre-substitution domain (here, the intermediate cipher text 20 in the square matrices 28) to more than one co-domain element, e.g., cipher symbol. To perform the homophonic substitution, for each matrix 28, nibbles (four bits) from the data elements 30 in each cell in the matrix 28 are swapped across the diagonal of that matrix 28. The selection of the specific nibbles to be swapped is based on a linear equation (meaning a two-variable equation that defines and graphs to a straight-line relationship between the two variables) of the form y=mx. Since "x" increments by a positive number from character to character, the nibbles that are swapped for each character in the block also vary, leading to an enhanced homophonic substitution. In the equation y=mx, at Step 138 the values of "m" (line slope), starting value of x, and the increment for x are determined from the final keys 14 generated in the key generation steps (FIG. 4) as per the following equations:
value of m=first key/last key
initial value of x=(first key·last key) mod 10
increment for x=(second key) mod 10

If the last key has a value of zero, then 4 is taken as a default value for the last key. In such a case, m=first key/4.

For the example final keys computed above:
m=0xCA/0x8E=202/142=1.4
initial value of x=(202·142) mod 10=4
increment for x=43 mod 10=3

In a more general sense, the linear equation for selecting the specific nibbles to be swapped can be in the form of y=mx+b, where "b" is a constant. As should be appreciated, the linear equation given above of y=mx has a "b" value of 0. Different values for "b" could be used, but since it is a constant offset, it would have no effect upon the overall encryption results.

Nibbles are swapped across the diagonal of the matrix, between data elements in locations "a[i] [j]" and "a[n-1-i] [n-1-j]" where:
matrix size=(n×n)
0≦i≦((n/2)-1)
0≦j≦(n-1)

Thus, with respect to the matrix 28a shown in FIG. 6:
n=5
0≦i≦1.5 (rounded to 2)
0≦j≦4
a[i][j] swapped with a[4-i] [4-j]:
a(0)(0)→a(4)(4); a(0)(1)→a(4)(3); a(0)(2)→a(4)(2); a(0)(3)→a(4)(1);
a(0)(4)→a(4)(0)
a(1)(0)→a(3)(4); a(1)(1)→a(3)(3); a(1)(2)→a(3)(2); a(1)(3)→a(3)(1);
a(1)(4)→a(3)(0)
a(2)(0)→a(2)(4); a(2)(1)→a(2)(3); a(2)(2)→a(2)(2)

As should be appreciated, each pair of square matrix cells defined by "a[i] [j]" and "a[n-1-i] [n-1-j]" forms an "exclusive pair," by which it is meant that a portion of the data element in each cell is swapped with a portion in one and only one other cell.

The specific steps for determining the nibbles to be swapped between the data elements are as follows. First, in Step 140, the value of y from the linear equation y=mx is calculated, based on the calculated values for m and the initial value of x. At Step 142, the value "y1" is calculated according to y1=(7-(y mod 8)), where y1 is the starting bit of the nibble that needs to be swapped. At Step 144, starting from y1, four bits in a[i] [j] are swapped with the corresponding bits in a[n-1-i] [n-1-j]. The bit positions that are swapped would be y1, ((y1+7) mod 8), ((y1+6) mod 8), and ((y1+5) mod 8). Then, at Step 146, the value of x is incremented by the increment value, e.g., in the example given above the increment value is three. Continuing, Steps 140-146 are repeated for each "i," as determined in Step 147, and for each matrix. In this manner, the plaintext data 12 is encrypted into the final cipher text 24, which can be stored in a file 26 as at Step 148. The file 26 may then be transmitted and later decrypted.

As noted above, existing homophonic substitutions map each element in the pre-substitution domain to disjoint subsets in the post-substitution co-domain. As an example, according to one existing method, each letter in the alphabet is mapped to one of a plurality of symbols exclusively associated with that letter (co-domain elements), wherein the number of symbols is based on the frequency of that letter in the language in question. For example:
"A" maps to: 3, 4, 12, 19, 23, 25, 32
"B" maps to: 5, 14, 20
"C" maps to: 1, 24, 34 and so on.

Here, e.g., "A" is an element in pre-substitution domain consisting of A, B, C . . . . The post-substitution co-domain consists of all the numeric symbols 1, 3, 4, 5, 12, 14, etc. The symbols 5, 14, and 20 are a disjoint subset of the co-domain for B, where by "disjoint" it is meant that none of the subsets have symbols in common, such that each symbol is exclusively associated with its corresponding letter. According to the process for enhanced homophonic substitution of the present invention, each data element in the pre-substitution domain (e.g., the data elements 30 in the matrices 28 prior to swapping) can be mapped to any of the elements in the post-substitution co-domain (e.g., the data elements in the matrices after swapping has taken place). For example, an 8-bit number in the pre-substitution (pre-swap) square matrix 28a could be mapped to any other 8-bit number in the co-domain, where the co-domain comprises all 256 possible 8-bit numbers (including zero). Thus, for each element, the subset to which the element can be mapped to in the co-domain is the entire co-domain itself, thereby providing the largest possible subset for the given co-domain. In addition, the particular element in the co-domain to which an element in the domain is mapped changes depending on the sequence of characters in the data block and the keys chosen.

For decryption, the encryption steps described above are performed in the reverse order, as follows. First, the nibbles in the square matrices are "re-swapped" in reverse order as described above in regards to FIG. 5. Before re-swapping the nibbles, the last few characters "R" (e.g., 28c in FIG. 6) that were left out after arranging the characters in blocks of square matrices are computed. If "R" is less than four, then the last "R" characters are interchanged with the first "R" characters of the last square matrix. Then, the storage format is again reversed, from big-endian to little-endian format or vice versa. Finally, polyalphabetic substitution is performed using the XOR operation and the final keys as described above.

As noted above, the method for symmetric key data encryption according to the present invention uses a composition of transformations. The involution used for homophonic substitution has the advantage of using the largest possible subset for the given co-domain to substitute a character. The transformation has the additional advantage of being dynamic, implying that the mapping of any given character to an element in the co-domain differs at different locations in the message text thus enhancing the security of the encryption technique.

The method of the present invention may be implemented using instructions executable by a computer or other electronic device, as stored on a computer readable medium (not shown) such as an optical disc, fixed disc, or integrated circuit.

Since certain changes may be made in the above-described method of symmetric key data encryption, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method of encrypting a plurality of data elements, said method comprising:
    mapping, using a processor, each of the plurality of data elements from a domain to one of a plurality of co-domain elements, wherein each of the plurality of data elements are mappable to any of the plurality of co-domain elements, wherein the co-domain element to which one of the plurality of data elements is mapped changes depending on the sequence of the plurality of data elements in the domain, and wherein the step of mapping further comprises:
        arranging, using the processor, the plurality of data elements into a plurality of cells in at least one square matrix;
        calculating, using the processor, a portion of the data element arranged in each of the plurality of cells using a linear equation, wherein the portion of the data element arranged in each of the plurality of cells is less than the whole of the data element arranged in each of the plurality of cells; and
        swapping, using the processor, the calculated portion of the data element arranged in each of the plurality of cells in exclusive pairs across a diagonal of the at least one square matrix, wherein the linear equation changes with each swap based on the sequence of the plurality of data elements in the domain.

2. The method of claim 1 wherein:
    the data element arranged in each of the plurality of cells is a binary number longer than four bits; and
    the calculated portion of the data element arranged in each of the plurality of cells for swapping is a nibble of four bits, said four bits being consecutive or non-consecutive.

3. The method of claim 1 comprising:
    generating, using the processor, one or more keys; and
    performing, using the processor, a polyalphabetic substitution operation on the plurality of data elements based on the one or more keys;
    wherein the linear equation is based at least in part on at least one of the keys.

4. The method of claim 3 wherein:
    the data element arranged in each of the plurality of cells is a binary number longer than four bits; and
    the calculated portion of the data element arranged in each of the plurality of cells for swapping is a nibble of four consecutive or non-consecutive bits.

5. The method of claim 1 comprising:
    generating, using the processor, one or more keys; and
    performing, using the processor, a polyalphabetic substitution operation on the plurality of data elements based on the one or more keys, wherein the linear equation is based at least in part on at least one of the keys.

6. A computer readable medium comprising instructions according to the method of claim 1.

7. A method of encrypting data comprising: mapping, using a processor, the data from a domain to one of a plurality of co-domain elements, wherein the data is mappable to any of the plurality of co-domain elements, wherein the step of mapping further comprises:
    dividing, using a processor, the data between a plurality of cells in at least one square matrix, wherein the plurality of cells in each of the at least one square matrix form exclusive pairs consisting of a first group and a second group;
    selecting, using the processor, a portion of the data divided in each of the plurality of cells using a linear equation, wherein the portion of the data divided in each of the plurality of cells is less than the whole of the data divided in each of the plurality of cells;
    swapping, using the processor, the selected portion of the data divided in each of the plurality of cells from the first group with a respective portion of the data divided in the respective plurality of cells from the second group; and
    changing, using the processor, the linear equation with each swap.

* * * * *